United States Patent
McGuire et al.

(10) Patent No.: US 6,796,907 B2
(45) Date of Patent: Sep. 28, 2004

(54) ONE-PIECE FLAG NUT

(75) Inventors: James T. McGuire, Davis, IL (US); Kenneth G. Lowry, Horton, IL (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/438,567

(22) Filed: May 15, 2003

(65) Prior Publication Data

US 2003/0228202 A1 Dec. 11, 2003

Related U.S. Application Data

(60) Provisional application No. 60/387,318, filed on Jun. 10, 2002.

(51) Int. Cl.[7] .......................... B21D 53/24; F16B 39/00
(52) U.S. Cl. ....................... 470/23; 411/169; 411/435; 411/973; 470/25
(58) Field of Search ................................. 411/169, 172, 411/427, 435, 973; 470/23, 25, 26

(56) References Cited

U.S. PATENT DOCUMENTS

| | | | |
|---|---|---|---|
| 2,397,238 A | * | 3/1946 | Brose ...................... 411/435 X |
| 2,513,037 A | * | 6/1950 | McLaughlin ............ 411/169 X |
| 3,935,787 A | * | 2/1976 | Fisher ..................... 411/169 X |
| 4,050,494 A | | 9/1977 | de Claire |
| 4,284,114 A | | 8/1981 | Korenobu |
| 4,405,285 A | | 9/1983 | Surdi |
| 4,523,710 A | | 6/1985 | Renshaw et al. |
| 4,530,629 A | | 7/1985 | Sakow |
| 4,572,718 A | | 2/1986 | Stevens et al. |
| 4,623,278 A | | 11/1986 | Merrell |
| 4,645,393 A | | 2/1987 | Pletcher |
| 4,734,001 A | | 3/1988 | Bennett |
| 4,735,533 A | | 4/1988 | Gallagher et al. |
| 4,781,502 A | | 11/1988 | Kushnick |
| 4,796,942 A | * | 1/1989 | Robinson et al. ........ 411/435 X |
| 4,820,096 A | * | 4/1989 | Knight ........................ 411/169 |
| 4,875,395 A | | 10/1989 | Alvarez |
| 4,906,150 A | | 3/1990 | Bennett |
| 5,711,644 A | | 1/1998 | Regnath et al. |
| 5,941,485 A | | 8/1999 | Davidson et al. |
| 5,954,466 A | | 9/1999 | Coffey et al. |
| 6,009,770 A | | 1/2000 | Och |
| 6,027,293 A | | 2/2000 | Beemer et al. |
| 6,257,813 B1 | | 7/2001 | Tanimura |

FOREIGN PATENT DOCUMENTS

GB    601436    *  5/1948   ................. 411/435

* cited by examiner

Primary Examiner—Neill Wilson
(74) Attorney, Agent, or Firm—Trexler, Bushnell, Giangiorgi, Blackstone & Marr, Ltd.

(57) ABSTRACT

A one-piece flag nut having a flag portion protruding perpendicularly to the axis of a nut portion thereof such that during installation, as the flag nut rotates, the flag portion catches on any nearby structure and acts as a wrench during the installation process. The one-piece flag nut is formed by an extrusion process, and preferably formed to have ribs provided on the flag portion thereof which provide strength to the flag nut. The outer edges of the flag portion are preferably rolled to prevent the flag portion from being hung up on the structure during the installation process, thus preventing the flag nut from being properly seated.

14 Claims, 3 Drawing Sheets

ONE-PIECE FLAG NUT

RELATED APPLICATION

This application claims the benefit of U.S. Provisional Application Ser. No. 60/387,318, filed Jun. 10, 2002.

BACKGROUND OF THE INVENTION

The present invention relates to fasteners typically referred to as flag nuts.

In order to secure two or more workpieces together, fasteners such as bolts or screws may be inserted through aligned apertures in the workpieces such that a head of the bolt or screw is positioned against the outer surface of one of the workpieces and the elongated threaded shaft that extends therefrom, extends beyond the outer surface of the other workpiece. In order to ensure tight securement of the bolt or screw to the workpieces, a nut having a threaded aperture therethrough is generally positioned around the shaft of the bolt or screw until it is positioned in tight engagement against the outer surface of the other workpiece.

In many applications, though, the nut needs to be placed in a location where there is limited access for a drive tool or even a hand wrench to tighten the nut. An earlier solution to this problem was the creation of a flag nut. The flag was a small piece of material to which the nut was attached. The flag protruded perpendicularly from the axis of the nut and, upon tightening of the nut, as the nut rotated, the flag caught on any nearby structure, for instance, a frame, such that the flag acted as a wrench during the tightening process.

Generally, flag nuts are two-piece designs. One known two-piece design has a spring steel flag crimped over a hex flange nut while another known two-piece design has the nut staked, welded or pierced onto or into the flag. These two known two-piece designs present certain problems.

With regard to the spring steel flag crimped to the nut, the spring steel flags, while having the appropriate level of stiffness and hardness, often also commonly suffer from brittle failures, including stress fractures and stress corrosion failures. This is because after stamping the shape of the flag, the part must be heat treated and, thus, the flag becomes highly stressed such that the brittle failures of the spring steel flags may occur. With regard to the staking, welding or piercing of the nut to the flag, there is always a question of the integrity of the stake, weld or pierce. Both designs are also complex, weighty, add to the manufacturing costs, and have the problem of having parts coming loose.

Flag nuts of the prior art also may have sharp edges which may come into contact with a structural member during installation. If the edge of the flag nut is sharp, the edge of the flag nut may hang up on the structural member during attachment such that the nut will not seat properly.

Thus, there is a need for a flag nut which overcomes disadvantages presented by two-piece flag nut designs.

OBJECTS AND SUMMARY

A primary object of an embodiment of the present invention is to provide a one-piece flag nut which has a flag portion which protrudes perpendicularly from the axis of a nut portion and where, upon tightening, as the flag nut rotates, the flag portion catches on any nearby structure and acts as a wrench during the tightening process.

An object of an embodiment of the present invention is to provide a one-piece flag nut that is not heat treated and, therefore, is not as likely to be susceptible to cracking or to brittle failures, including stress fractures and stress corrosion failures.

Another object of an embodiment of the present invention is to provide a one-piece flag nut that has ribs formed on the flag portion thereof to stiffen the one-piece flag nut in order to reduce buckling and bending of the flag portion during installation.

Another object of an embodiment of the present invention is to provide a one-piece flag nut that has rolled edges to prevent the flag portion of the one-piece flag nut from being snagged or hung up during nut rundown on the bolt.

Another object of an embodiment of the present invention is to provide a one-piece flag nut that has outer edges which maintain uniform material thickness throughout the installation because of being formed by an extrusion process, thus maintaining uniform strength of the one-piece flag nut.

Still another object of an embodiment of the present invention is to provide a one-piece flag nut which has reduced complexity in comparison to flag nuts of the prior art.

Yet another object of an embodiment of the present invention is to provide a one-piece flag nut which has a reduced weight in comparison to flag nuts of the prior art.

Another object of an embodiment of the present invention is to provide a one-piece flag nut which requires a lower manufacturing cost in comparison to flag nuts of the prior art.

Still another object of an embodiment of the present invention is to provide a one-piece flag nut which does not have separate parts such that loose parts can come loose during installation.

Another object of an embodiment of the present invention is to provide a one-piece flag nut which will not have questions about the integrity of a weld, stake or pierce.

Briefly, and in accordance with the foregoing, an embodiment of the present invention provides a one-piece flag nut having a flag portion protruding perpendicularly to the axis of a nut portion thereof such that during installation, as the flag nut rotates, the flag portion catches on any nearby structure and acts as a wrench during the installation process. The one-piece flag nut is formed by an extrusion process. The one-piece flag nut is further formed to have ribs provided on the flag portion thereof which provide added strength to the flag nut. The outer edges of the flag portion are also rolled to prevent the flag portion from being hung up on the structure during the installation process, thus preventing the flag nut from being properly seated.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

Figure 1:
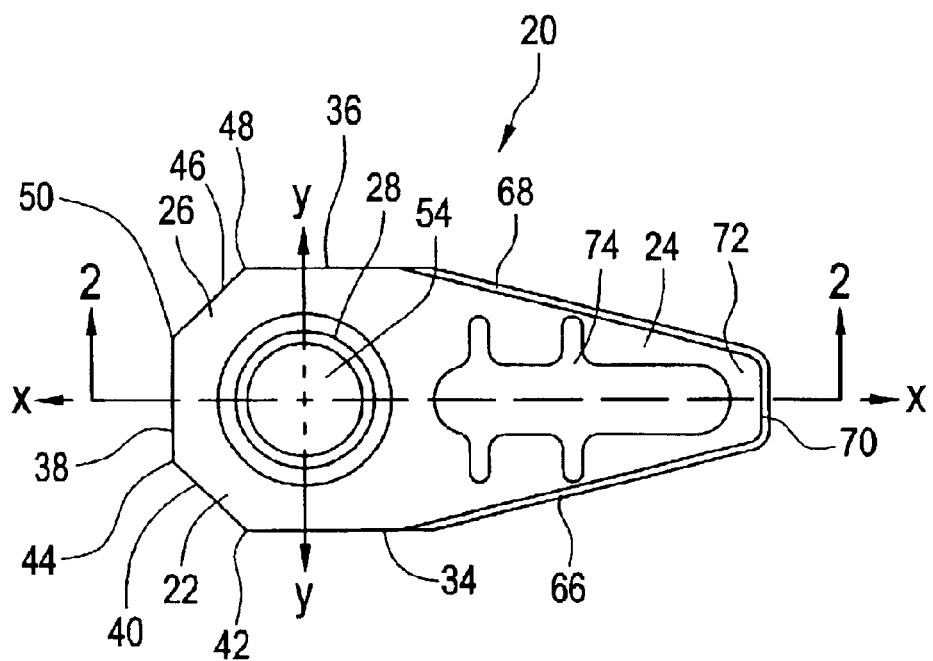
FIG. 1 is a top plan view of the flag nut of the invention.

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

Figure 2:
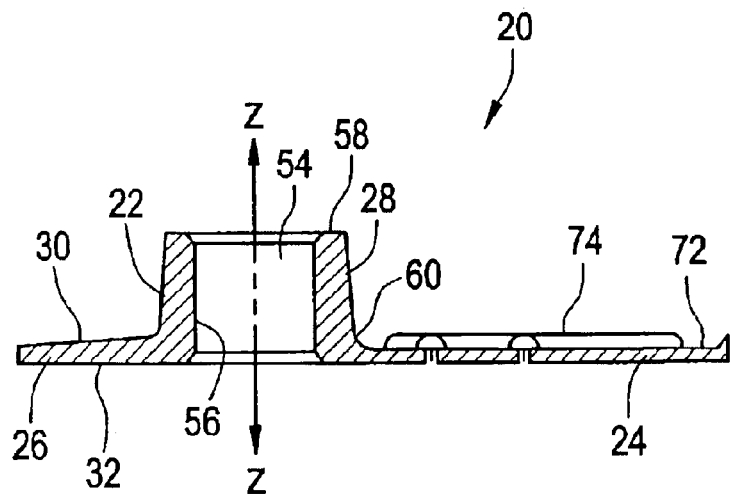
FIG. 2 is a cross-sectional side view of the flag nut of the invention taken through line 2—2 of FIG. 1.
Figure 3:
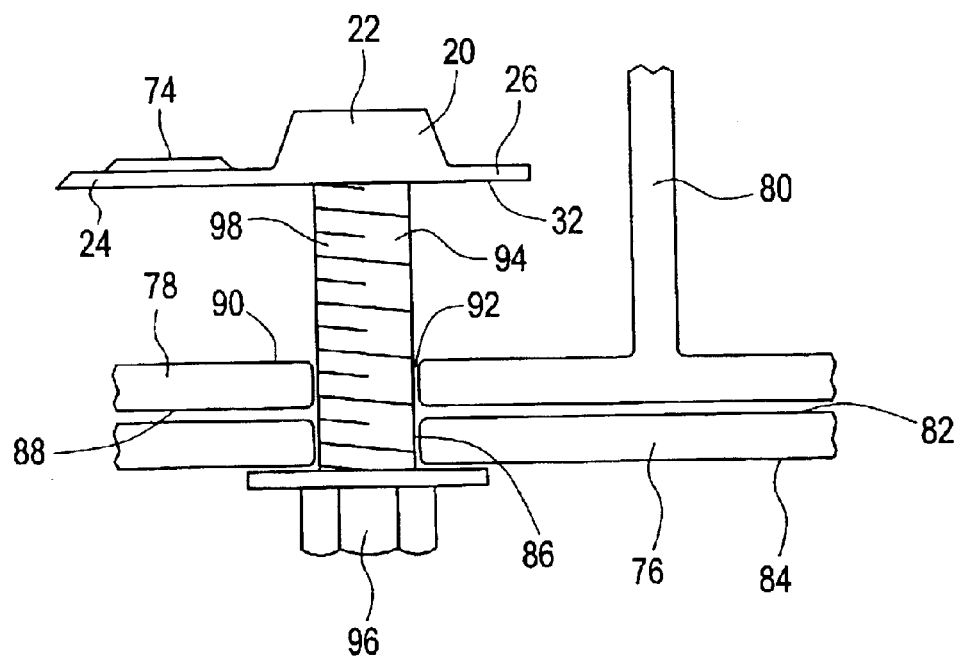
FIGS. 3–5 are side elevational views of the operation of utilizing the flag nut of the invention.
Figure 4:
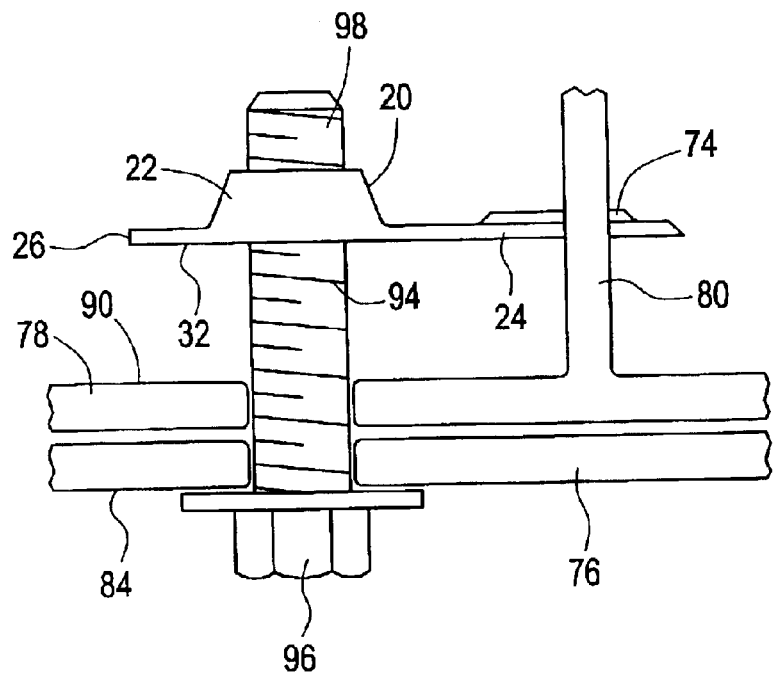
Figure 5:
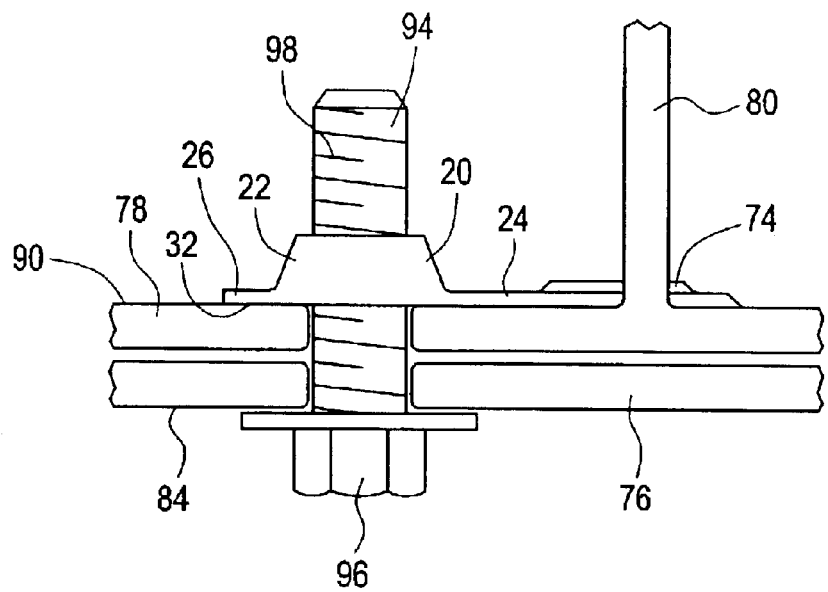
Figure 6:
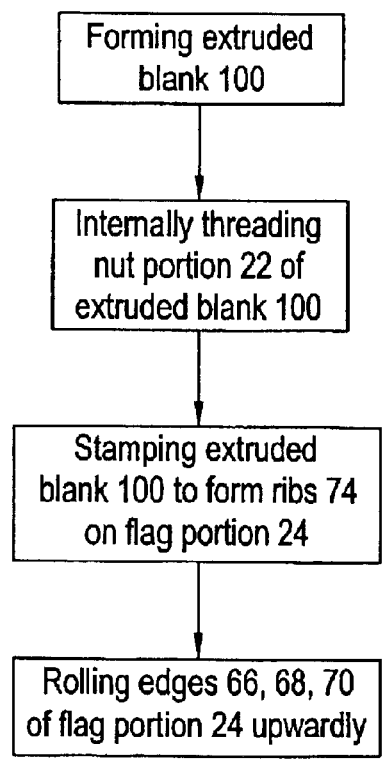
FIG. 6 is a block diagram of a method of manufacturing the flag nut of the invention.

FIGS. 1 and 2 illustrate a flag nut 20 which is in accordance with an embodiment of the present invention, while FIGS. 3–5 illustrate use of the flag nut 20 and FIG. 6 illustrates the method of manufacture of the flag nut 20. The flag nut 20 is of a one-piece construction and, upon tightening, as the flag nut 20 rotates, the flag nut 20 catches on any nearby structure 80 and acts as a wrench during the tightening process. The flag nut 20 is not heat treated and thus is not as likely to be susceptible to cracking or to brittle failures. The flag nut 20 further has ribs 74 formed on a flag portion 24 thereof to stiffen the flag nut 20 in order to reduce buckling and bending of the flag portion 24 during installation. The flag nut 20 further has rolled edges 66, 68, 70 to prevent the flag portion 24 from being snagged or hung up during nut rundown on the bolt 94. The flag nut 20 further will be formed by an extrusion process, to allow the flag nut 20 to maintain uniform strength, reduce complexity, reduce weight, lower manufacturing costs, remove questions about the integrity of a weld, stake or pierce, and to provide a part that does not have loose parts.

The flag nut 20 generally includes a nut portion 22 and a flag portion 24 which are integrally formed together by an extrusion process.

The nut portion 22 includes a base 26 and an upstanding wall 28 extending therefrom. The base 26 has a top side 30 and a bottom side 32 with the upstanding wall 28 extending outwardly from the top side 30 of the base 26. The base 26 is generally flat and can have any configuration desired. When viewed as in FIG. 1, the base 26 preferably has a first edge or side 34 positioned below the upstanding wall 28, a second edge or side 36 positioned above the upstanding wall 28 and a third edge or side 38 positioned to the left of the upstanding wall 28, with the first and second edges 34, 36 being parallel to one another and the third edge 38 being perpendicular to both the first and second edges 34, 36. A fourth edge or side 40 connects a first end 42 of the first edge 34 to a first end 44 of the third edge 38. A fifth edge or side 46 connects a first end 46 of the second edge 36 to a second end 48 of the third edge 38. A second end 50 of the first edge 34 and a second end 52 of the second edge 36 are connected to ends of the flag portion 24, as will be discussed herein.

The upstanding wall 28 is integrally formed with the base 26, is preferably cylindrical, and is centered around axis Z—Z, as illustrated in FIG. 2. An aperture 54 is provided through the upstanding wall 28 and defines an aperture wall 56. As best illustrated in FIG. 2, the aperture 54 extends through the upstanding wall 28 from a top end 58 of the upstanding wall 28 to a bottom end 60 of the upstanding wall 28, as well as through the base 26 from the top side 30 of the base 26 to the bottom side 32 of the base 26. The aperture wall 56 is preferably threaded.

The flag portion 24 is integrally formed with the nut portion 22 and extends from the base 26 of the nut portion 22 such that it has ends connected to both the second end 50 of the first edge 34 and the second end 52 of the second edge 36. The flag portion 24 protrudes perpendicularly outwardly from the base 26 of the nut portion 22 along the axis X—X relative to both the axis Y—Y and the axis Z—Z.

When viewed as in FIG. 1, a first edge 66 of the flag portion 24 extends outwardly to the right and upwardly from the second end 60 of the first edge 34 of the base 26. A second edge 68 of the flag portion 24 extends outwardly to the right and downwardly from the second end 62 of the second edge 36 of the base 26. A third edge 70 of the flag portion 24 connects ends of the first and second edges 66, 68 of the flag portion 24 together, which are opposite of the ends of the first and second edges 66, 68 of the flag portion 24 which are connected to the second end 50 of the first edge 34 and the second end 52 of the second edge 36, respectively.

The edges 66, 68, 70 of the flag portion 24 are preferably rolled upwardly, as best illustrated in FIG. 2, such that during installation, the flag portion 24 will not hang up or become snagged on a structural member 80, thus preventing the proper seating of the flag nut 20 against an outer surface 90 of a member 78.

A top side 72 of the flag portion 24, which is commensurate with the top side 30 of the base 26 of the nut portion 22, has ribs 74 which extend upwardly therefrom, as best illustrated in FIG. 2. As best illustrated in FIG. 1, the ribs 74 also extend outwardly along the top side 72 of the flag portion 24 relative to the axis X—X, toward the first and second edges 66, 68. The ribs 74 can be formed in any configuration, for instance that as shown in FIG. 1, so long as the ribs 74 perform their desired function of stiffening the flag portion 24, thus reducing buckling and bending of the flag portion 24 during the installation process.

Installation of the flag nut 20 will now be discussed with regard to FIGS. 3–5. The flag nut 20 is utilized when it is desired, for example, to attach a first member 76 to a second member 78, where the second member 78 has a structural member 80 extending therefrom proximate to the area of the first and second members 76, 78 where they are to be connected together, such that a regular nut cannot be easily attached thereto by a drive tool because of space restrictions. The first member 76 has an inner surface 82 and an outer surface 84 and an aperture 86 therethrough. Likewise, the second member 78 has an inner surface 88 and an outer surface 90 and an aperture 92 therethrough. The structural member 80 extends from the outer surface 90 of the second member 78.

Prior to installation, as illustrated in FIG. 3, the first and second members 76, 78 are positioned against one another such that their inner surfaces 82, 88 are positioned next to one another and the apertures 86, 92 are in alignment with one another. A bolt 94 having an enlarged head portion 96 and an elongated shaft 98, which is threaded, extending therefrom is inserted through the aligned apertures 86, 92. With the bolt 94 inserted through the aligned apertures 86, 92, the enlarged head portion 96 of the bolt 94 is positioned against the outer surface 84 of the first member 76 and the elongated shaft 98 extends through the apertures 86, 92 and past the outer surface 90 of the second member 78.

The flag nut 20 is started on the bolt 94, such as by hand, by threadedly engaging the aperture wall 56 of the nut portion 22 of the flag nut 20 with the elongated shaft 98 of the bolt 94. As illustrated in FIG. 4, the flag nut 20 is rotated relative to the bolt 94 until flag portion 24 of the flag nut 20 comes into contact with the structural member 80 of the second member 78. As the edges 66, 68 of the flag portion 24 are rolled, the flag portion 24 will not hang up or become snagged on the structural member 80 during the installation process, thus preventing the proper seating of the flag nut 20 against the outer surface 90 of the second member 78.

Once the flag portion 24 of the flag nut 20 is in contact with the structural member 80, a drive tool (not shown), such as a power driver, is engaged with the enlarged head portion 96 of the bolt 94 and rotates the bolt 94 relative to the flag nut 20, as the flag nut 20 acts as wrench during the installation process, holding the flag nut 20 is place. As the bolt 94 is rotated, the flag nut 20 will travel or run down the length of the elongated shaft 98 of the bolt 94 until the bottom side 32 of the base 26 of the nut portion 22 is seated against the outer surface 90 of the second member 78, as illustrated in FIG. 5, thus securing the first and second members 76, 78 together.

The ribs 74 provided on the flag portion 24 of the flag nut 20 stiffen the flag portion 24, thus reducing buckling and bending of the flag portion 24 during the installation process in comparison to flag portions of two-piece flag nut designs.

As the flag nut 20 is formed in a one-piece design in an extrusion process, the flag nut 20 has reduced complexity, weight, manufacturing costs and the potential for brittle fractures in comparison to the two-piece flag nut designs of the prior art. Also, the one-piece design also ensures that no parts will come loose and there is no concern about the integrity of the connection between the nut and the flag, as there is in the two-piece flag nut designs of the prior art. The flag nut 20 also has outer edges which maintain uniform material thickness throughout the installation because it is formed by an extrusion process.

As best illustrated in FIG. 6, the flag nut 20 is formed by initially extruding a metal blank 100 into the shape of the flag nut 20, but without the rolled edges 66, 68, 70, the threaded nut portion 22, and the ribs 74. The nut portion 22 of the extruded blank 100 is then internally threaded. The extruded blank 100 is then stamped to form the ribs 74 on the flag portion 24 thereof. Finally, the edges 66, 68, 70 of the flag portion 24 are rolled upwardly. It should be noted that while this is the preferred process of manufacturing the flag nut 20, the sequence of operation of these steps can be varied as desired.

While a preferred embodiment of the invention is shown and described, it is envisioned that those skilled in the art may devise various modifications without departing from the spirit and scope of the foregoing description.

What is claimed is:

1. A method of making a one-piece flag nut, said method comprising: extruding a metal blank into a predetermined shape which comprises a nut portion having an axis and a flag portion protruding perpendicularly to the axis of the nut portion, internally threading the nut portion, and forming ribs on the flag portion.

2. A method as defined in claim 1, wherein said ribs are formed on the flag portion by stamping.

3. A method as defined in claim 1, further comprising rolling edges of the flag portion.

4. A method as defined in claim 1, wherein said nut portion comprises a base and a wall extending from said base.

5. A method as defined in claim 4, wherein said base is generally flat.

6. A method of making a one-piece flag nut, said method comprising: extruding a metal blank into a predetermined shape which comprises a nut portion having an axis and a flag portion protruding perpendicularly to the axis of the nut portion, internally threading the nut portion, and stamping ribs into the flag portion.

7. A method as defined in claim 6, further comprising rolling edges of the flag portion.

8. A method as defined in claim 6, wherein said nut portion comprises a base and a wall extending from said base.

9. A method as defined in claim 8, wherein said base is generally flat.

10. A method of making a one-piece flag nut, said method comprising: extruding a metal blank into a predetermined shape which comprises a nut portion having an axis and a flag portion protruding perpendicularly to the axis of the nut portion, internally threading the nut portion, and rolling edges of the flag portion.

11. A method as defined in claim 10, further comprising forming ribs on the flag portion.

12. A method as defined in claim 11, said ribs are formed on the flag portion by stamping.

13. A method as defined in claim 10, wherein said nut portion comprises a base and a wall extending from said base.

14. A method as defined in claim 13, wherein said base is generally flat.

* * * * *